(12) United States Patent
Gopalakrishnan et al.

(10) Patent No.: US 10,331,375 B1
(45) Date of Patent: Jun. 25, 2019

(54) DATA STORAGE AREA CLEANER

(71) Applicant: Amazon Technologies, Inc., Reno, NV (US)

(72) Inventors: Nandakumar Gopalakrishnan, Seattle, WA (US); Kerry Quintin Lee, Seattle, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 13/924,125

(22) Filed: Jun. 21, 2013

(51) Int. Cl.
*G06F 3/06* (2006.01)
*G06F 12/0891* (2016.01)
*G06F 12/02* (2006.01)

(52) U.S. Cl.
CPC .......... *G06F 3/0652* (2013.01); *G06F 3/0631* (2013.01); *G06F 12/0253* (2013.01); *G06F 12/0891* (2013.01); *G06F 2212/7205* (2013.01)

(58) Field of Classification Search
None
See application file for complete search history.

(56) References Cited

U.S. PATENT DOCUMENTS 5,109,336 A * 4/1992 Guenther et al. ............. 711/171
8,321,638 B2 * 11/2012 van Riel et al. ............. 711/154
8,843,691 B2 * 9/2014 Calvert et al. ............. 711/103
2009/0307423 A1 * 12/2009 Galloway et al. ........... 711/114
2011/0055455 A1 * 3/2011 Post et al. .................. 711/103
2013/0204848 A1 * 8/2013 Akirav .................. H04L 47/10
707/692
2014/0207997 A1 * 7/2014 Peterson ............ G06F 12/0246
711/103

OTHER PUBLICATIONS

Fred Knight, "Trim-DRAT/RZAT Clarifications for ATA8-ACS2," Revision 2, Feb. 23, 2010, 6 Pgs., USA.
Jeffrey Layton, "Fixing SSD Performance Degradation, Part 1, p. 2," Oct. 28, 2010, [retrieved Aug. 26, 2013], 2 Pgs., USA http://www.enterprisestorageforum.com/technology/article.php/11182_3910451_2/Fixing-SSD-Performance-Degradation-Part-1.htm.
Nikolaus Jeremic et al., "Enabling TRIM Support in SSD Raids," ISSN 0944-5900, Sep. 2011, 18 Pgs., Germany.
Martin K. Petersen et al., "Linux & Advanced Storage Interfaces," Jul. 2, 2011, 12 Pgs., USA.

* cited by examiner

*Primary Examiner* — Sean D Rossiter
*Assistant Examiner* — Charles J Choi
(74) *Attorney, Agent, or Firm* — Davis Wright Tremaine LLP

(57) ABSTRACT

A block-level data storage system receives a request to delete a data storage volume. As a result, the data storage volume is deleted and the areas comprising the volume are released and reaped. The areas may contain non-zero data within a plurality of data storage chunks that comprise the areas. An area cleaner is configured to zero out the areas for allocation to a newly created data storage volume.

23 Claims, 10 Drawing Sheets

DATA STORAGE AREA CLEANER

BACKGROUND

Data storage systems have evolved and continue to evolve to keep up with the demands of the organizations that use them. Many organizations, for example, utilize data storage systems for, among other reasons, the purpose of generating storage volumes to support virtual computing instances and providing high performance input/output (I/O) intensive workloads. These data storage systems often utilize common hardware to store data on behalf of multiple users. Despite their many advantages, modern data storage systems present many challenges, especially in connection with maintaining efficient yet secure access to data.

For example, in some instances, data storage space allocated to one user can be reallocated to another user. To provide for secure transition from one user to the next, the reallocation process may include removing (erasing) data before the transition, such as by overwriting data with zeros, random information, or otherwise. Despite best efforts to avoid it, the process of removing one user's data to allocate storage space for another can result in performance degradation while the data is removed, such as by causing additional latency. Additionally, failing to remove data before reallocating storage space may have the unintended result of making one user's data available to another. Adequately addressing these risks can present additional costs to the organizations that rely on the data storage systems and to the computing resource service provider that provides a data storage system service.

BRIEF DESCRIPTION OF THE DRAWINGS

Various embodiments in accordance with the present disclosure will be described with reference to the drawings, in which.

DETAILED DESCRIPTION

Figure 1:
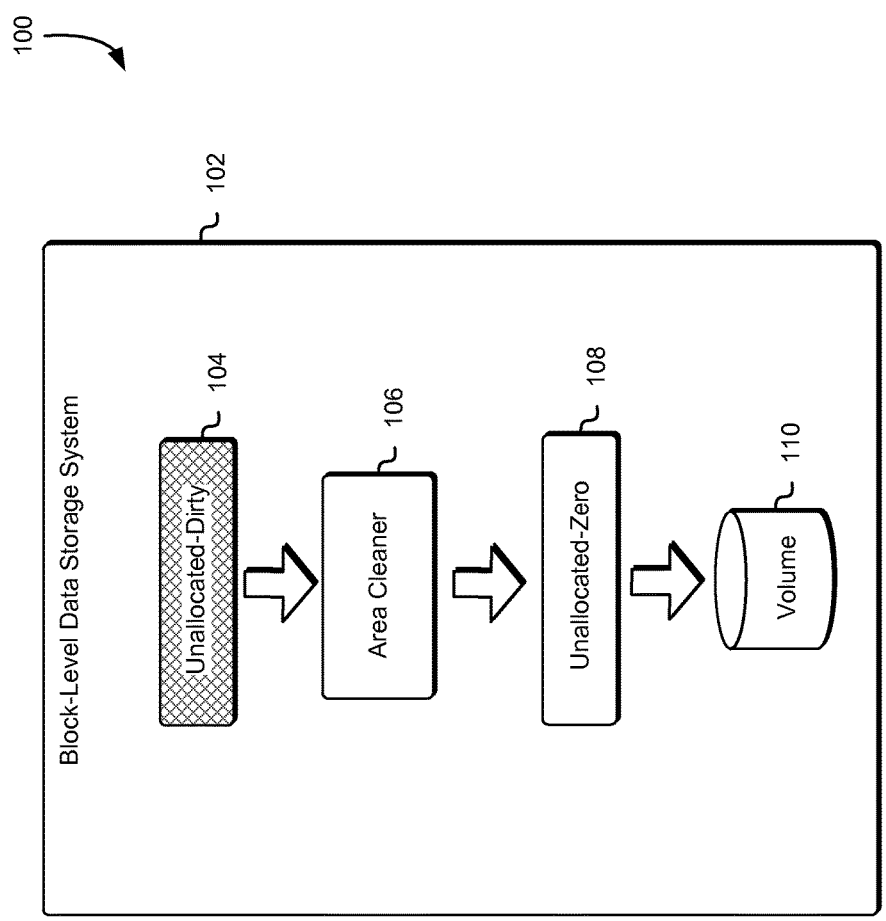
FIG. 1 shows an example diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a computer-implemented technique for the cleaning (e.g., zeroing out, erasing all data therein) of non-zero data storage areas that may be used to comprise a data storage volume in a block-level data storage system. In an embodiment, an entity (e.g., an organization) may communicate with a block-level data storage service, such as through appropriately configured application programming interface (API) calls to the service, to request creation of a volume that may, for example, be utilized in conjunction with a virtual computer instance. The entity may be a customer of a computing resource service provider that operates various services such as virtual computer system services, block-level data storage services and/or database services. When a volume is created in the block-level data storage system, the system may allocate a plurality of areas from a device manager to match the volume capacity. In some embodiments, an area may be a partition that is obtained from a single logical volume. The single logical volume may be comprised of one or more storage devices (e.g., solid-state drives or magnetic disk drives) that may be striped together to operate as a single large storage device. When a volume is deleted, the areas that comprise the volume may be released and reaped (e.g., returned to the server). In various embodiments, the areas may be divided further into sub-areas (e.g., data storage chunks). Each sub-area may be configured to individually and redundantly track whether or not it has been initialized. A chunk may comprise one or more data blocks each having a corresponding logical block address of a logical block addressing schema.

In various embodiments, an area cleaner may be used to clean non-zero areas and data storage chunks. An area cleaner, in some embodiments, is an application executed by a data storage server. The area cleaner may, for instance, be a component (e.g., programming module) of a device manager of the data storage server. The area cleaner may be configured to classify each data storage area into one or more categories in order to identify which areas need to be cleaned. For instance, if an area has been allocated to a volume, a device cleaner configured to utilize an area cleaner may classify this area as an "allocated" area and thus the area cleaner may not clean that area. Alternatively, if an area has been deallocated from a volume but has not been zeroed out, the device manager may classify this area as an "unallocated-dirty" area that may need to be cleaned by the area cleaner. An "unallocated-dirty" area may be, for instance, an area that still includes data after being released from a volume. In an embodiment, if an unallocated-dirty area has not been cleaned, the device manager may be configured to deny the area from being allocated to a new volume. Once the area cleaner has modified an unallocated-dirty area such that it has been zeroed out, the area cleaner may classify the newly cleaned area as "unallocated-zero." Accordingly, the unallocated-zero areas may be made available for allocation. The area cleaner may be configured to persistently and possibly redundantly store the classification for each area within a metadata file. While the present disclosure uses zeroing out extensively for the purpose of illustration, other methods of preparing storage space for allocation may be used. For example, the area cleaner may be configured to replace any existing data within a non-zero area with random data and/or non-random data that is not considered private and/or sensitive. As another example, data may be encrypted under a key that is then electronically destroyed (i.e., to which access is lost).

In some embodiments, the unallocated-dirty areas may be kept in a priority queue for cleaning. The priority queue may be used to rank unallocated-dirty areas such that the unallocated-dirty area with the highest priority may be cleaned first. As noted above, if an unallocated-dirty area has not been cleaned, the area may not be allocated to a new volume. In an embodiment, the area cleaner may be configured to maintain a clean/dirty bit for every data storage chunk in an area. The clean/dirty bit may be persistently stored within the metadata for each area. These bits may be used to determine which areas require greater cleaning efforts. Accordingly, the highest priority in the queue may be given to an area with the lowest number of dirty bits stored in its metadata. The area cleaner may access the area with the highest priority and proceed to clean all dirty chunks within the area while ignoring all existing clean chunks. Once the area has been zeroed out, the area cleaner may select the next unallocated-data area in the queue until there are no remaining unallocated-dirty areas.

In an embodiment, each volume may be configured to include a flag which may be used to specify if unallocated-dirty areas may be allocated to the volume. The flag may be used if there are no unallocated-zero areas available to satisfy the storage capacity of the volume. For instance, if the area manager has not been able to clean a sufficient amount of unallocated-dirty areas to satisfy the incoming volume demand, the device manager may be configured to trigger the flag within these new volumes such that unallocated-dirty areas may be allocated to the volumes. Thus, the volume demand may be satisfied while the dirty areas used may be cleaned upon a customer's initial interaction with the volume.

In this manner, a block-level data storage service may be able to provide clean volumes (e.g., volumes with allocated, zeroed out areas) to customers. In addition, the techniques described and suggested herein facilitate additional technical advantages. For example, because, in some embodiments, the area cleaner may be configured to clean unallocated-dirty areas with the lowest amount of dirty chunks first, areas that may be used for allocation into a volume may become available at a faster rate. Additionally, since, in an embodiment, the device manager may trigger a volume flag to allow allocation of unallocated-dirty areas to a volume, the block-level data storage system may not be substantially delayed if sufficient unallocated-zero areas are available. This, in turn, may reduce the cost of any downtime, particularly for a customer that is relying on access to the volume to support a virtual machine instance. Additional uses are also enabled by the various techniques described herein.

FIG. 1 shows an example diagram 100 illustrating various aspects of the present disclosure. In the diagram 100, a block-level data storage system 102 may be configured to allocate one or more areas into a volume 110 for use by a customer. In a block-level data storage system 102, storage volumes 110 may be created which may enable a customer utilizing, for instance, a virtual machine instance to connect to the volumes 110 and use them as persistent storage devices. Each storage volume 110 that is created for a customer may comprise a plurality of areas which may match the capacity of the volume 110 created. For instance, if a customer specifies that he or she requires a one terabyte volume to support a virtual machine instance, the block-level data storage system 102 may be configured to allocate one thousand, one gigabyte areas to the volume to satisfy the requirements of the one terabyte volume. Each area that may be allocated to a volume may be further divided into smaller data storage chunks. These chunks may be configured to individually and redundantly track whether or not it has been initialized. Thus, each data chunk may include a bit that may be used to track whether the data chunk has been initialized. Additionally, the area cleaner 106, as will be described in greater detail below, may include metadata which may be associated with each data chunk to redundantly track whether or not the data chunk has been initialized. Each area may be a partition created by the block-level data storage system 102 from a larger single logical volume. The single logical volume may comprise a plurality of storage devices (e.g., hard drives) that may be striped together by the block-level data storage system 102 to form the single logical volume.

In order to allocate an area to a volume 110, the block-level data storage system 102 may be configured to require (e.g., enforce one or more conditions) that a data storage area (referred to simply as an area) be zeroed out in order to prevent any customer data from being accessed by a new customer requesting the volume. Additionally, as noted above, an area may be required by the data storage system 102 to be zeroed out prior to allocation in order to prevent additional latency resulting from the need to zero out an allocated area. Accordingly, as illustrated in FIG. 1, the diagram 100 includes an area classified as an unallocated-dirty area 104. As noted above, areas may be classified into different categories depending on their current state. For instance, an area that has been allocated to a volume may be categorized as an "allocated" area. An unallocated-dirty area 104 may be created when an area allocated to a volume has been released and reaped. The area may be released, classified as unallocated-dirty, and reaped when a volume is deleted upon a customer request. Accordingly, the unallocated-dirty area 104 may comprise customer data that has not been deleted through the process of zeroing out the area.

The block-level data storage system 102 may be configured such that no unallocated-dirty areas 104 may be allocated to a new volume 110 until it has been cleaned. Accordingly, as illustrated in FIG. 1, the diagram 100 may include an area cleaner 106 that may be configured to clean any unallocated-dirty areas 104. The area cleaner 106 may be integrated into a device manager within the block-level data storage system 102. As noted above, each area may comprise a plurality of data storage chunks. In some embodiments, these data storage chunks may be of uniform size within an area and/or within a data storage device and/or a data storage system and/or collection of data storage systems. The size of each data storage chunk may be greater than or equal to the size of a block within the block storage device. While uniform data storage chunk sizes are used extensively throughout the present disclosure for the purpose of illustration, the scope of the present disclosure is not limited to uniform sizes. For instance, a block storage device may be configured to implement non-uniform data storage chunks. Each data storage chunk may include a bit that may be used to specify whether the chunk is clean or dirty. If the chunk is classified as dirty, the area cleaner 106 may persistently store information tracking the state of the chunk in a metadata file associated with the area. Thus, the area cleaner 106 may be configured to determine which areas comprise the most chunks identified as dirty. When a volume is deleted and the areas within the volume are released and reaped, the device manager may be configured to use the area cleaner 106 to prioritize the unallocated-dirty areas 104. The unallocated-dirty areas 104 with the highest priority may be the areas with the fewest chunks identified as dirty. Accordingly, the area cleaner 106 may be configured to clean the unallocated-dirty area with the highest priority.

Once an area has been zeroed out, the area cleaner 106 may be configured to update the metadata for that area such that the area is classified as "unallocated-zero." Accordingly, as illustrated in FIG. 1, the diagram 100 may include an unallocated-zero area 108. Once an area has been cleaned and classified as an unallocated-zero area, the area cleaner 106 may make the area available for allocation. For instance, the block-level data storage system 102 may be configured to determine the capacity of the system based on the number of unallocated-zero areas 108 available for allocation. Accordingly, the device manager may reserve the unallocated-zero areas 108 for a new volume. At this point, the area cleaner 106 may update the metadata for each unallocated-zero area such that the areas may be classified as having been allocated. Once this occurs, the device manager may proceed to allocate the areas to a new volume 110.

Figure 2:
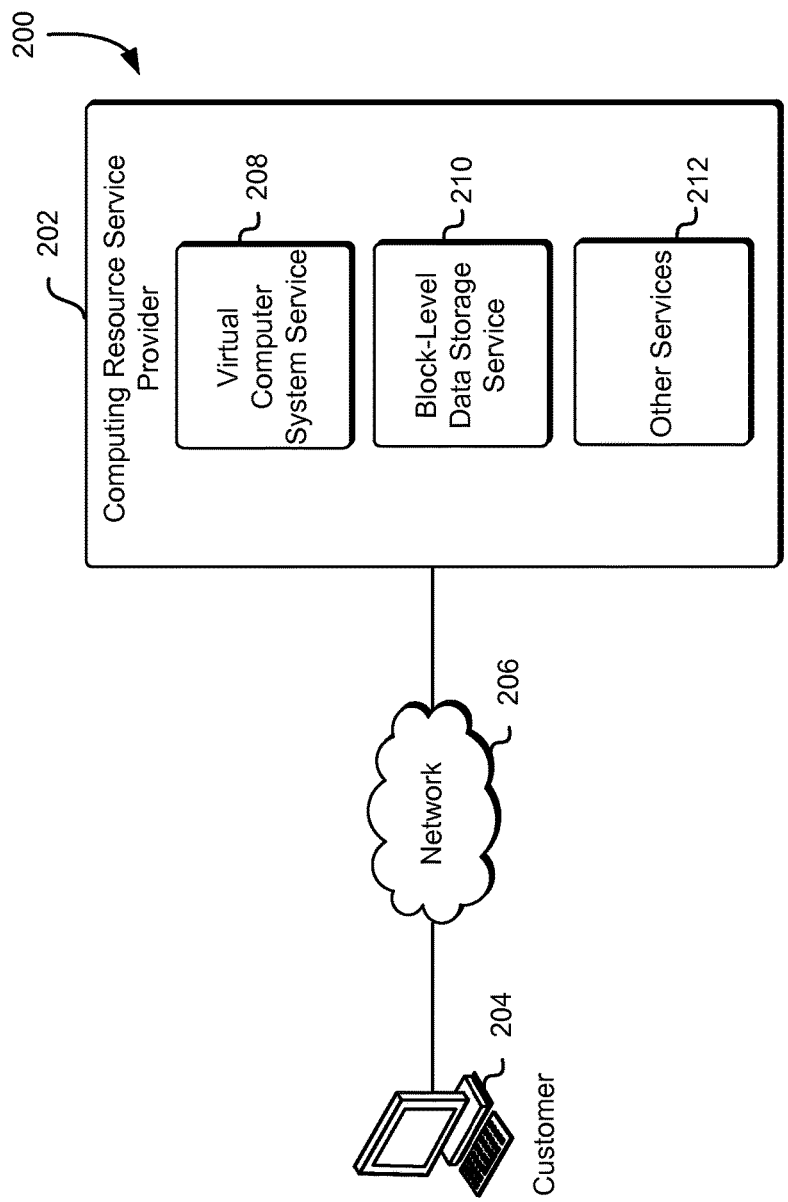
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to operate and support one or more database applications or services for its own customers. Additionally, the customer 204 may be an individual that could utilize the various services to persistently store information generated in performing a task. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least two types of services. The services provided by the computing resource service provider, in this example, include a virtual computer system service 208, a block-level data storage service 210, and one or more other services 212, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

The block-level data storage service 210 may comprise a collection of computing resources that collectively operate to store data for a customer 204. For instance, the block-level data storage system may be configured to provide block-level data storage volumes for use with a virtual machine instance, as noted above. A customer 204 may interact with the block-level data storage service 210 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer 204, through properly configured API calls to the service, may create a file system on top of the block-level data storage volumes or utilize the volume as a block-level storage device (e.g., a hard drive).

When a customer 204 provisions a block-level storage volume, the block-level data storage system may be configured to allocate a plurality of areas that, when combined, provide the storage capacity required for the volume. The block-level data storage system may comprise a series of servers which may further comprise one or more data storage devices (e.g., hard drives). These data storage devices may be striped together to form a single logical volume. The block-level data storage system may be configured to create a plurality of areas from the single logical volume. Each area may further comprise a plurality of data storage chunks that may be configured to individually and redundantly track whether or not it has been initialized. If a data storage chunk has been initialized, then the data storage chunk may change a bit within the data storage chunk to identify it as having been initialized. The areas that are created by the block-level data storage system may provide a certain capacity when allocated to a customer data volume. Accordingly, the block-level data storage system may be configured to interface with a device manager to identify any available areas for allocation to a new customer data volume.

In some embodiments, the device manager may only allocate areas to a volume that have been zeroed out. For instance, if an area has been released and reaped from another volume, that area may be classified as unallocated-dirty. The unallocated-dirty area may still include data associated with another customer and thus there may be the potential of a customer accessing this data without authorization. Accordingly, a block-level data storage system may be configured to remove this data by zeroing out the area. As noted above, in order to zero out an area, the device manager may include an area cleaner that is configured to identify the unallocated-dirty areas and zero the areas out. The area cleaner may be configured to maintain a priority queue for all unallocated-dirty areas such that the area cleaner may zero out an area with the highest priority. For instance, in an embodiment, an area that comprises the least amount of dirty data storage chunks may be given the highest priority since it may require less time for an area cleaner to zero out this area. As noted above, if a data storage chunk has been initialized, the data storage chunk may trigger a bit that identifies the data storage chunk as having been initialized. Accordingly, the area with an initialized data storage chunk may be considered to be non-zero or "dirty."

The area cleaner may be configured to categorize each area in the block-level data storage system and maintain a metadata file for each area. For instance, as noted above, the area cleaner may be configured to categorize an area as "allocated," "unallocated-dirty" or "unallocated-zero." An allocated area may be an area that is currently allocated to a volume. An area that has not been zeroed out and has not been allocated to a volume may be categorized as an unallocated-dirty volume. Finally, an area that has been zeroed out using an area cleaner and has not been allocated to a volume may be categorized as an unallocated-zero area. The area cleaner may be configured to only clean unallocated-dirty areas and ignore any allocated or unallocated-zero areas. Once the unallocated-dirty areas have been cleaned, the area cleaner may be configured to influence the device manager to assign and allocate the newly cleaned areas to a volume.

In an embodiment, the block-level data storage system may be configured to forego using the area cleaner and trigger a flag within a volume such that unallocated-dirty areas may be allocated to a volume. For instance, if all areas are either unallocated-dirty or allocated to other volumes, the device manager may be configured to report that there is no capacity to fulfill any new volume requirements. Additionally, in such an instance, an area cleaner may be unable to provide unallocated-zero area rapidly enough to satisfy the volume requirements. Accordingly, if a computing resource service provider 202 may provide adequate safeguards to prevent unauthorized access to customer data that may persist in an unallocated-dirty area, such as area cleaning on demand (otherwise known as "first touch"), the block-level data storage system may be configured to modify the volume tags to accept unallocated-dirty areas.

The computing resource service provider 202 may additionally maintain one or more other services 212 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level data storage services, object-level archival data storage services, services that manage other services and/or other services.

Figure 3:
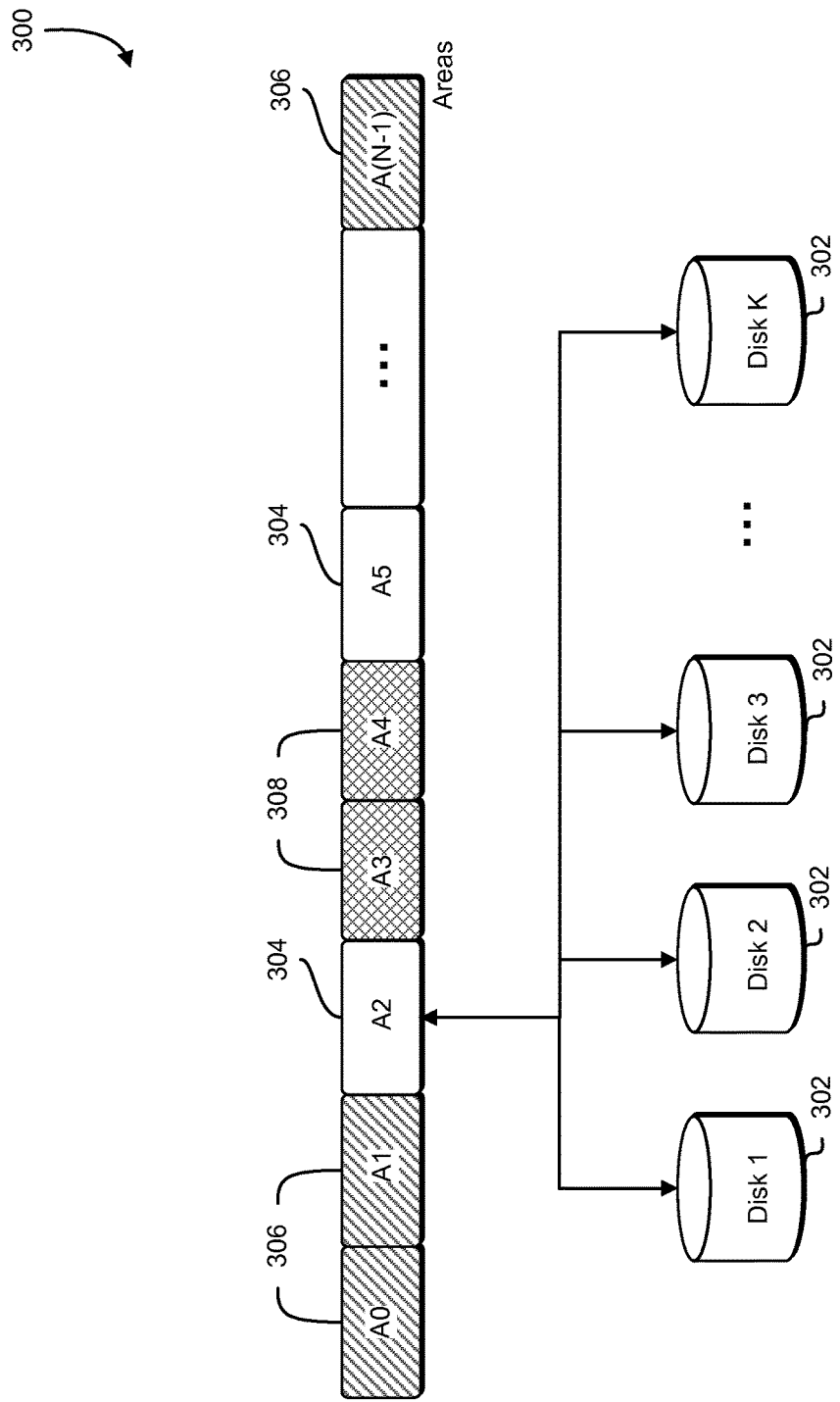
FIG. 3 shows an illustrative example of an environment in which various embodiments can be implemented.

As noted above, a single logical volume may be used to create a plurality of areas that may be allocated to a volume. Accordingly, FIG. 3 is an illustrative example of a plurality of areas on a single logical volume in accordance with at least one embodiment. As illustrated in FIG. 3, the environment 300 may comprise a single logical volume that may be further divided into a plurality of areas. Each area may be a partition of the single logical volume. For instance, an area may represent a one gigabyte partition of the single logical volume that may be combined with other areas to match the capacity of a storage volume. Accordingly, the environment 300 may include a plurality of server storage devices 302 such as hard drives or disks that may be striped together to form the single logical volume. The block-level data storage may be configured to create the plurality of areas from this single logical volume. As a result, each area may be tied to one or more storage devices 302 in the block-level data storage system.

As illustrated in FIG. 1, an area cleaner within a device manager may be configured to associate each area into a plurality of classifications. Accordingly, the environment 300 may include areas with different classifications. For example, as illustrated in FIG. 3, the single logical volume may include one or more unallocated-zero areas 304, one or more allocated areas 306 and one or more unallocated dirty areas 308. These classifications may be persistently stored in a metadata file by the area cleaner. Accordingly, the area cleaner may be configured to use this metadata to identify the areas that are to be cleaned. Alternatively, any areas that are not to be cleaned may be ignored by the area cleaner. This may permit the area cleaner to perform a plurality of cleaning functions efficiently.

An unallocated-zero area 304 may be an area that has been cleaned (e.g., zeroed out) by an area cleaner such that the area may not contain any prior customer data or information. Thus, the unallocated-zero area may be completely zeroed out or clean. When a volume is created, the device manager may be configured to identify all available unallocated-zero areas 304 and report the block-level data storage system capacity that may be used to fulfill any volume requirements. Thus, if there are no unallocated-zero areas 304 available, the device manager may report that the block-level data storage system has no capacity. Once all unallocated-zero areas 304 have been identified, the device manager may reserve and allocate any unallocated-zero areas 304 to a newly created volume in order to match its capacity. Accordingly, once the unallocated-zero areas 304 have been allocated to a volume, the area cleaner may modify the metadata for these areas such that the areas may be classified as allocated.

An area cleaner may be configured to ignore any allocated areas 306 in order to prevent zeroing out any areas that may contain current customer data. As noted above, the area cleaner may be configured to classify an area allocated to a volume as an allocated area 306. Since an allocated area 306 may comprise customer data within a volume, the allocated area 306 may be considered a dirty, or non-zero, area. Accordingly, once a customer specifies that a volume is to be deleted, the block-level data storage system may be configured to release and reap all allocated areas 306 within the now deleted volume.

Once an allocated area 306 has been deallocated from a volume, the area cleaner may update the metadata for the deallocated data storage area such that it may be classified as an unallocated-dirty area 308. As noted above, each unallocated-dirty area 308 may be organized into a queue within the area cleaner such that the area cleaner may select and clean the unallocated-dirty areas 308 with the highest priority. Each unallocated-dirty area may comprise a plurality of blocks, dependent on the granularity level desired by the computer resource service provider, that may be used to identify how many data storage chunks within an area are dirty (e.g., non-zero). This may allow the area cleaner to only clean the dirty data storage chunks within an unallocated-dirty area rather than all data storage chunks in the area. Accordingly, the area cleaner may be configured to grant the highest priority to an unallocated-dirty area with the lowest number of dirty data storage chunks. After an unallocated-dirty area has been cleaned and thus zeroed out, the area cleaner may be configured to update the metadata for the cleaned area to classify the area as an unallocated-zero area 304.

As noted above, the block-level data storage system may be configured to allocate unallocated-dirty areas 308 into a newly created volume. For instance, each newly created volume may include a flag which may be configured to identify whether the device manager may allocate unallocated-dirty areas 308 onto the volume. The block-level data storage system may be configured to trigger this flag in certain situations. For instance, if the block-level data storage system is restarted, all unallocated areas may be treated as unallocated-dirty areas 308. In this scenario, the block-level data storage system may be configured to report that there is currently no capacity. Accordingly, the area cleaner may be configured to begin cleaning all unallocated-dirty areas 308. However, if the area cleaner is unable to satisfy the demand for areas needed for allocation to any newly created volumes, the block-level data storage system may trigger the flag within the volumes such that the device manager may allocate unallocated-dirty areas 308.

Figure 4:
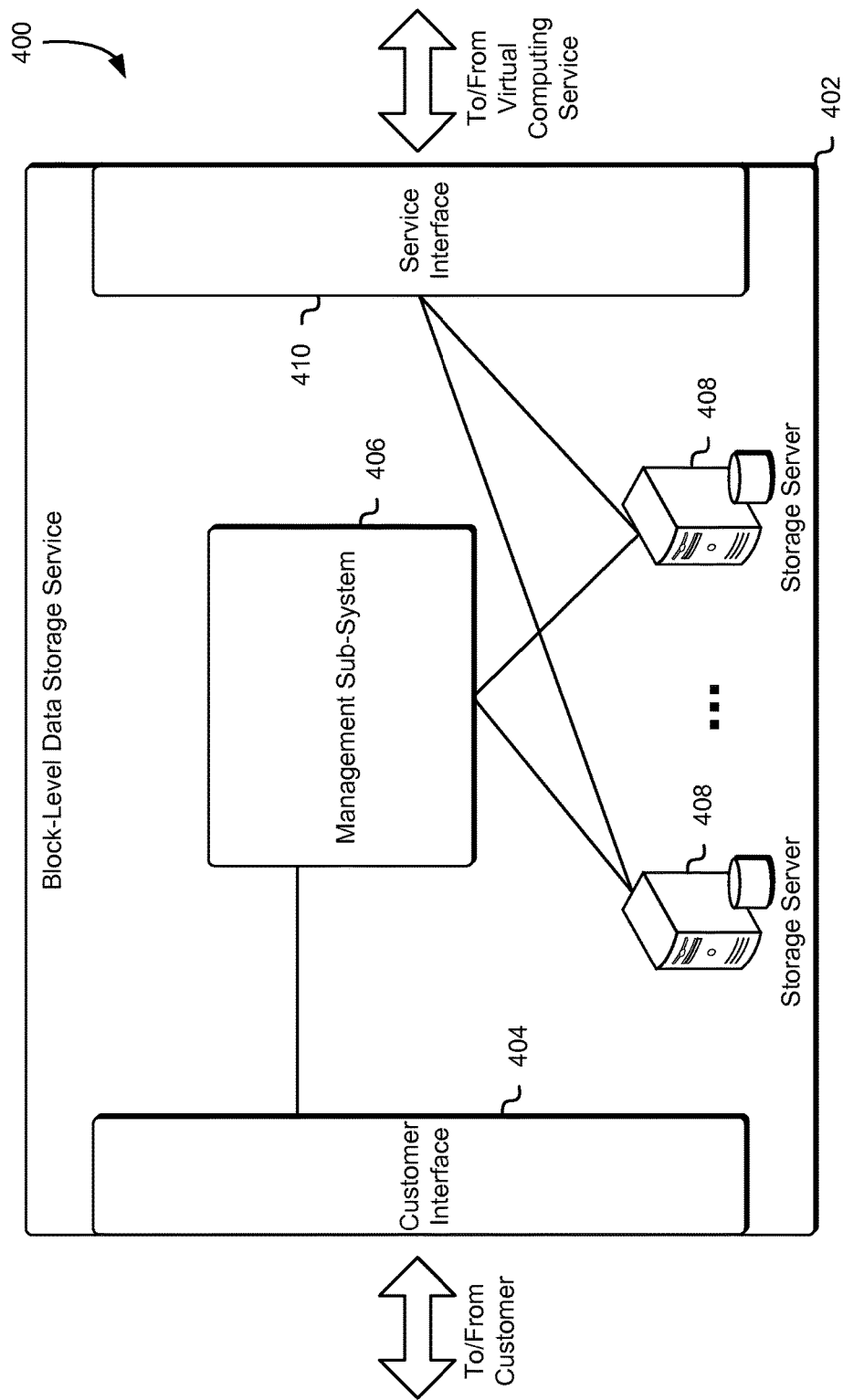
FIG. 4 shows an illustrative example of an environment in which various embodiments can be implemented.

In various embodiments, a customer may communicate with a block-level data storage service through, for example, appropriately configured API calls to the service. Accordingly, FIG. 4 shows an illustrative example of an environment 400 that includes various components of a block-level data storage service 402 in accordance with at least one embodiment. The block-level data storage service 402 may provide customers with a customer interface 404 that may enable a customer to access the block-level data storage service 402. A customer may utilize the customer interface 404 through one or more communications networks, such as the Internet. The customer interface 404 may allow a customer to submit a request (e.g., API call) to the service. For instance, the customer may utilize the customer interface 404 to submit a request for a data storage volume which may be used to instantiate a virtual computing instance.

The block-level data storage service 402 may be configured to allow a customer to interact with a management sub-system 406 through one or more properly configured API calls made through the customer interface 404. For instance, the management sub-system 406 may enable a customer to remotely provision a data storage volume to persistently store data associated with a virtual machine instance. The management sub-system may include a storage manager which may be configured to maintain and manage one or more storage servers 408. The storage manager may be configured to receive a properly configured API call to the service for the creation or deletion of a data storage volume and submit the request to the one or more storage servers 408. Additionally, the management sub-system may include a placement service which may be configured to determine which storage server 408 has available capacity (e.g., unallocated-zero areas) to satisfy a request to create a new storage volume. For instance, the placement service may select use the request to select a server 408 that has the capacity to satisfy the request and transfer the request accordingly.

A storage server 408 may comprise a plurality of data storage devices (e.g., solid-state drives, magnetic media drives, etc.) which may be striped together to form one or more single logical volumes. Each single logical volume may be used to generate a plurality of data storage areas which, in turn, may be allocated to a customer data volume. All areas allocated to a volume, when combined, may match the total capacity of the customer data volume. Thus, a customer data volume may comprise storage capacity from a plurality of data storage devices. The capacity may be generated using one or more storage servers 408.

Each storage server 408 may include executable instructions that cause the storage server 408 to operate a device manager which may be persistently stored on the server 408 and programmed to manage the storage devices within the server 408. The device manager, as will be illustrated below, may be configured to perform a variety of operations relating to customer data volumes and the areas that comprise them. For instance, when a customer submits a request through the customer interface 404 to the management sub-system 406 to have a volume deleted, the management sub-system 406 may transmit one or more commands through the server system manager to the storage servers 408 used to generate the volume. Accordingly, the device manager within each of the storage servers 408 may prioritize these areas for cleaning. Alternatively, if a customer submits a request through the customer interface 404 to the management sub-system 406 to generate a customer data volume, the device manager may reserve any free areas and allocate these to the newly created customer data volume.

The storage servers 408 may additionally include an area cleaner programmed within the device manager. The area cleaner, as noted above, may be configured to clean any unallocated dirty (e.g., non-zero) areas that may reside within the storage server 408. When a customer requests that a volume be deleted, the area cleaner may be configured to clean the areas that formerly comprised the volume such that these areas may be ready for allocation. The storage servers 408 may be configured to maintain a metadata store for each area that may derive its capacity from the servers 408 in order classify the area as allocated or unallocated and zero or non-zero. Accordingly, the area cleaner may be configured to clean only unallocated non-zero areas and update the metadata associated with the area one it has been cleaned. The area cleaner may be configured to influence the device manager to allocate any newly cleaned areas to a volume. When this occurs, the area cleaner may again update the metadata associated with each area allocated to the volume.

Once a customer data volume has been created, the storage servers 408 may interact with a service interface 410 to assign the newly created volume to a customer virtual machine instance. Accordingly, the customer may now use the virtual computing service to perform one or more operations and persistently store data on the volume. As noted above, the customer data volume may be mounted as a storage device (e.g., hard drive) onto a virtual machine instance. Thus, the customer data volume may be configured to behave like a raw, unformatted block storage device which a customer may interact with through the customer interface 404.

Figure 5:
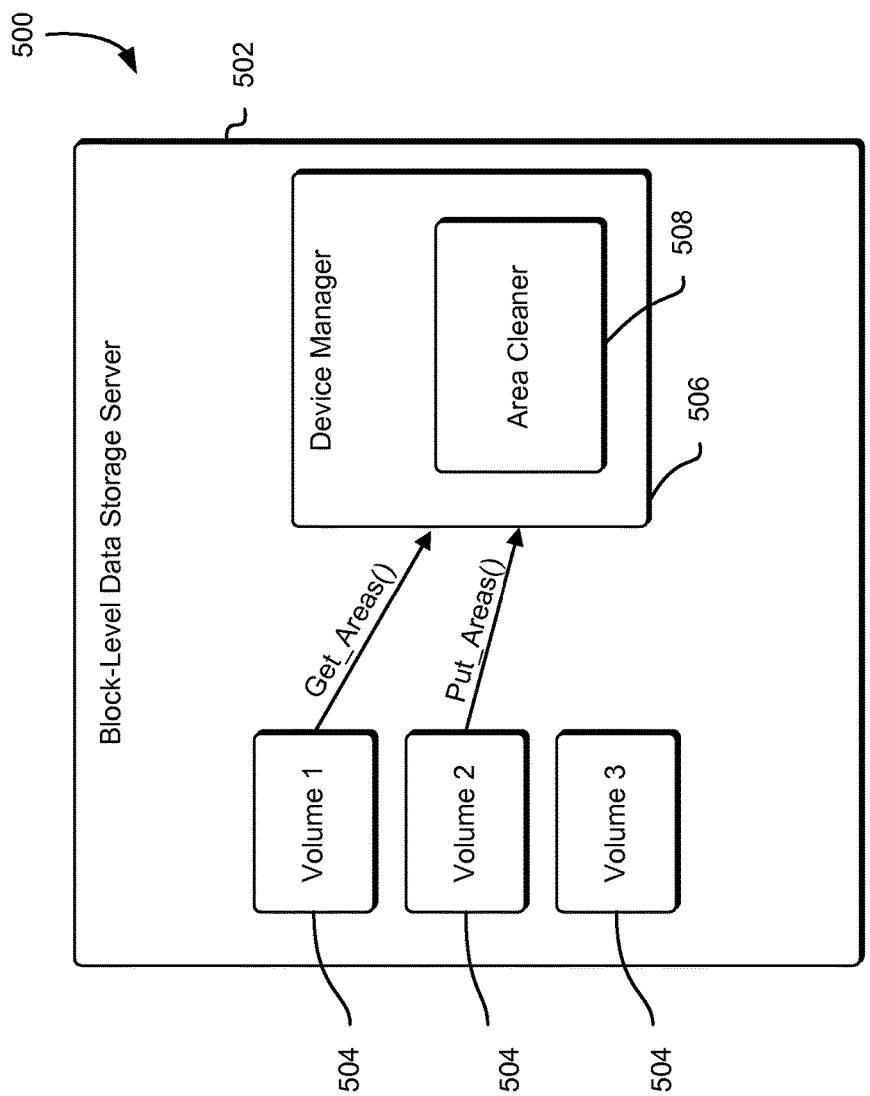
FIG. 5 shows an illustrative example of an environment in which a device manager is configured to handle volumes in accordance with at least one embodiment.

As noted above, a customer, through properly configured API calls, may request that the block-level data storage system create or delete a storage volume. Accordingly, FIG. 5 is an illustrative example of an environment 500 for creating and deleting a plurality of storage volumes in accordance with at least one embodiment. The environment 500 may include a block-level data storage server 502 that, as noted above, may comprise a collection of computing resources that collectively operate to store data for one or more customers. The block-level data storage server 502 may thus maintain a plurality of storage devices (e.g., one or more servers or hard drives) for storing customer data. These storage devices may be striped together to form a single logical volume such that customer data may be stored on multiple storage devices. As illustrated in FIG. 3, this single logical volume may be divided into a plurality of partitions or areas which may be allocated to each customer depending on his or her requirements.

When a customer submits a request to the block-level data storage server 502 through a properly configured API call for storage, the block-level data storage server 502 may create a volume 504 for the customer. The volume 504 may comprise a plurality of areas that, when combined, match the capacity of the requested volume 504. For instance, if an area represents a one gigabyte partition and the requested volume capacity is one terabyte, the block-level data storage server 502 may allocate one thousand, one gigabyte areas to the volume for customer use. Each area may further be comprised of one or more data storage chunks. The data storage chunks may each be configured to maintain a bit to identify whether the data storage chunk has been initialized or not. If the data storage chunk has been initialized, then the bit may be triggered until such time that the data storage chunk is zeroed out. The customer may utilize a newly created volume 504 to persistently store any data produced through the use of a virtual machine instance. Accordingly, the volume 504 may be mounted as a storage device (e.g., a hard drive) onto a virtual machine instance. Additionally, the customer may create a file system on top of the volume 504 or utilize the volume as a block-level storage device.

After the block-level data storage server 502 has created a new volume 504 to satisfy a customer request, the newly created volume 504 may be configured to transmit a command to a device manager 506 for a plurality of areas needed to match the volume capacity. The device manager 506 may be configured to report the existing capacity of the block-level data storage system. For instance, if there is no remaining capacity available for a newly created volume 504, the device manager may be configured to generate an error message or a message detailing the estimated amount of time before there is sufficient capacity to satisfy the customer request. However, if there is sufficient capacity to match the volume capacity, the device manager 506 may be configured to reserve the free areas required to match the capacity and allocate these areas to the volume 504.

In order to prepare an area for allocation, the block-level data storage server 502 may maintain an area cleaner 508 which may be configured to operate with the device manager 506. As noted above, the area cleaner 508 may be used to classify each area into separate categories such that only zeroed out areas may be allocated to a newly created volume. For instance, the area cleaner 508 may be configured to classify each area into one or more categories depending on whether the area has been allocated or not and on whether the area is dirty or clean (e.g., no data present in an area). As noted above, an area that has been allocated to a volume may be classified as "allocated-dirty." Additionally, an area that has no data in it and has not been allocated to a volume may be classified as "unallocated-zero." As illustrated in FIG. 5, if a customer requests that a volume 504 be deleted, the block-level data storage server 502 may transmit a command executable by the device manager 506 to release and reap any areas that may have been allocated on the volume 504. The area cleaner 508 may be configured to classify these newly deallocated data storage areas as "unallocated-dirty." When the area cleaner 508 classifies an area, it may be configured to store the classification in a metadata file associated with the area.

The area cleaner 508 may be additionally configured to queue and prioritize any unallocated-dirty areas for cleaning. For instance, in an embodiment, the area cleaner 508 may only clean initialized (e.g., dirty) data storage chunks within an unallocated-dirty area. Thus, in order to efficiently process any unallocated-dirty areas, the area cleaner 508 may be configured to grant the highest priority to an unallocated-dirty area with the fewest dirty data storage chunks. Once an area has been zeroed out, the area cleaner 508 may be configured to change re-classify the area as an unallocated-zero area and update the metadata file associated with the area to reflect the change. Accordingly, the unallocated-zero may be made available to the device manager 506 for allocation to a volume 504.

Figure 6:
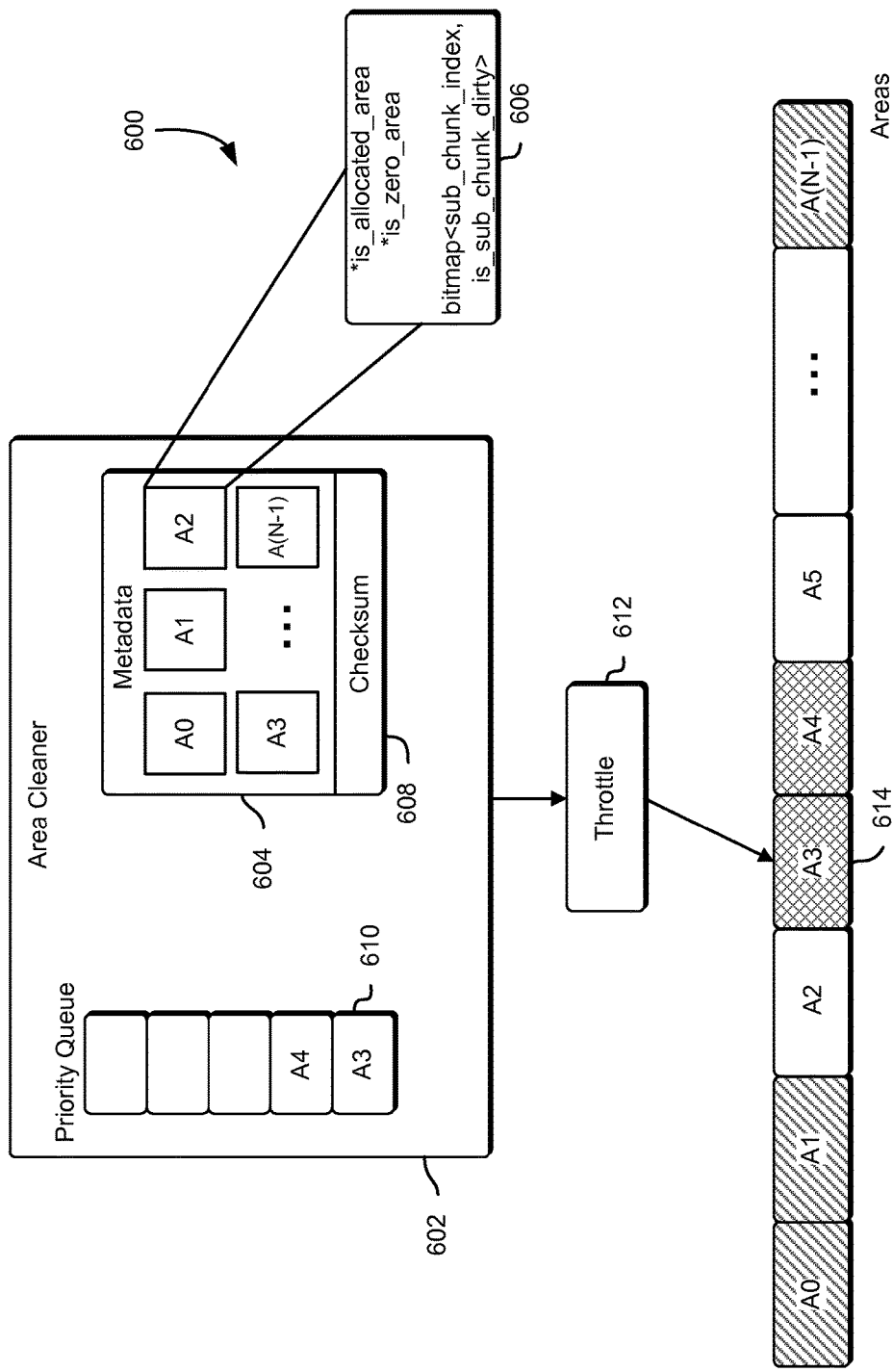
FIG. 6 shows an illustrative example of components that may comprise an area cleaner in accordance with at least one embodiment.

As noted above, the block-level data storage service may maintain and operate a device manager. The device manager may be configured to operate with an area cleaner which may be used to zero out any areas that are to be allocated to a storage volume. Accordingly, FIG. 6 is an illustrative example of an area cleaner in accordance with at least one embodiment. In the environment 600, an area cleaner 602 may be used to zero out any areas in order to ensure that no prior customer data is available to a different customer upon volume creation. The area cleaner 602 may be configured to maintain a metadata store 604 for a plurality of metadata files for each of the areas comprising a single logical volume. The area cleaner 602 may be configured to write and read the metadata store 604 to determine which areas require cleaning and which areas it may ignore. For instance, in an embodiment, the area cleaner 602 may be configured to ignore any unallocated-zero and allocated-dirty areas within the single logical volume. However, the area cleaner 602 may be configured to find any unallocated-dirty areas and prioritize them for cleaning.

Accordingly, each metadata file in the metadata store 604 may contain information 606 that may be used to classify each area. As illustrated in FIG. 6, in an embodiment, the metadata file may comprise a series of flags and a bitmap (generally, a map) which may be used to identify the state of each data storage chunk within an area. For instance, the information 606 in a metadata file may include a flag which may be used to determine whether an area has been allocated to a volume or not. Additionally, the information 606 in the metadata file may include a flag which may be used to determine whether an area has been zeroed out (e.g., cleaned) or whether an area is dirty. The area cleaner 602 may maintain a clean/dirty bit for every data storage chunk in each area within the metadata for the area. These bits may be used to generate a bitmap which may be used to prioritize unallocated-dirty areas. This information 606 may be used to determine which areas the area cleaner 602 may be configured to clean. For instance, using the example illustrated in FIG. 6 of the information 606 included in a metadata file, if the metadata file for an area has the *is_allocated_area flag set to "TRUE," the area cleaner 602 may be configured to not clean this area. This may also occur if the *is_zero_area is set to "TRUE." While the flags and bitmap illustrated above are used extensively throughout the present disclosure for the purpose of illustration, the scope of the present disclosure is not necessarily limited to the contents of a metadata file explicitly noted herein.

The area cleaner 602 may be configured to update the metadata file for each area. For instance, if an unallocated-zero area is allocated to a newly created volume, the area cleaner 602 may be configured to find the metadata file associated with the area in the metadata store 604 and edit the information 606 in the file such that the *is_allocated_area is set to "TRUE" and the *is_zero_area is set to "FALSE." Additionally, the area cleaner 602 may be configured to keep track of all data storage chunks that have been initialized within the area in order to maintain a bitmap of the complete area. Alternatively, if an unallocated-dirty area is cleaned, the area cleaner may be configured to edit the information 606 in the metadata file such that the *is_allocated_area is still set to "FALSE" and the *is_zero_area is set to "TRUE." In this fashion, the area cleaner 602 may be configured to keep track of all the areas and only clean the ones that may be unallocated and dirty. In an embodiment, the metadata may be updated at least in part by a verifier that may be a process (which may be referred to as a verification nprocess) executing on the data storage server that reads portions (e.g., contiguous logical block addresses areas collectively of a specified size) of the data storage devices and verifies that the portions are readable. If data is found in accordance with the verifier to contain zeroes, metadata for one or more corresponding chunks may be updated, as appropriate. In this manner, the metadata is updated by a process executing independently of the area cleaner.

In addition to the metadata store 604, the area cleaner 602 may be configured to maintain a checksum 608 of the metadata. The purpose of the checksum 608 is to provide information usable to cross-verify the integrity of the metadata in the event of a serious or total failure of the block-level data storage system or a single logical volume. For instance, if there is a failure within the block-level data storage system requiring a hot restart of the system, the checksum 608 may be used to ensure the metadata store has not been compromised or damaged as a result of the system failure. Accordingly, if the metadata store has been damaged, the checksum values for the existing metadata store 604 and the value stored in the checksum 608 may not match which may indicate an error. If an error exists, the block-level data storage service may, for example, replace the metadata store 604 with a backup known to have no errors associated with it. Alternatively, the block-level data storage service may classify all available areas as unallocated-dirty and allow the area cleaner 602 to clean the areas.

As noted above, the device manager may be configured to prioritize any unallocated-dirty areas for cleaning. Accordingly, the area cleaner 602 may include a priority queue 610 for determining which unallocated-dirty areas may be cleaned first. The device manager may be configured to examine the bitmap in the metadata file for each unallocated-dirty area to determine which areas have the fewest dirty bits. Subsequently, the device cleaner may interface with the area cleaner 602 to generate a priority queue 610 based on unallocated-dirty areas with the fewest dirty bits. Thus, an unallocated-dirty area with the fewest dirty bits may be given the highest priority and cleaned first. As noted above, the area cleaner 602 may be configured to only clean any dirty data storage chunks within an area. Thus, prioritizing unallocated-areas based on the number of dirty bits within the areas may reduce the time needed to clean a plurality of areas. It should be noted that while priority may be given to unallocated-dirty areas with the fewest dirty bits, other criteria may be used to grant areas higher priority position and are thus covered by the present disclosure.

If the area cleaner 602 is permitted to perform I/O operations, the area cleaner 602 may absorb all available network and disk bandwidth, thus preventing other I/O operations from taking place. Accordingly, the area cleaner 602 may encounter a throttle 612 that may be configured to limit the I/O operations of the area cleaner 602. The throttle 612 may include a plurality of buckets with each bucket comprising a plurality of tokens that the area cleaner 602 must obtain prior to performing any I/O operations on an area. For instance, the throttle 612 may include a disk bucket that may be used to govern the available disk bandwidth. The disk bucket may comprise a plurality of tokens that may match the total disk bandwidth. Thus, the area cleaner 602 may only be able to obtain a number of tokens minus any tokens used for other I/O operations on the disk. Accordingly, the area cleaner 602 may not be able to consume the entire disk bandwidth.

Once the area cleaner 602 has obtained at least one token from the disk bucket in the throttle 612, the area cleaner may obtain the unallocated-dirty area 614 from the single logical volume. Accordingly, the area cleaner 602 may be configured to zero out the unallocated-dirty area. Subsequently, the metadata file associated with the area 614 located in the metadata store may be updated to classify the area 614 as being unallocated-zero. The area cleaner 602 may be configured to make the area 614 available for allocation, after which the device manager may allocate the area 614 to a newly created volume and update the metadata file for the area 614 to show that the area 614 has been allocated.

Figure 7:
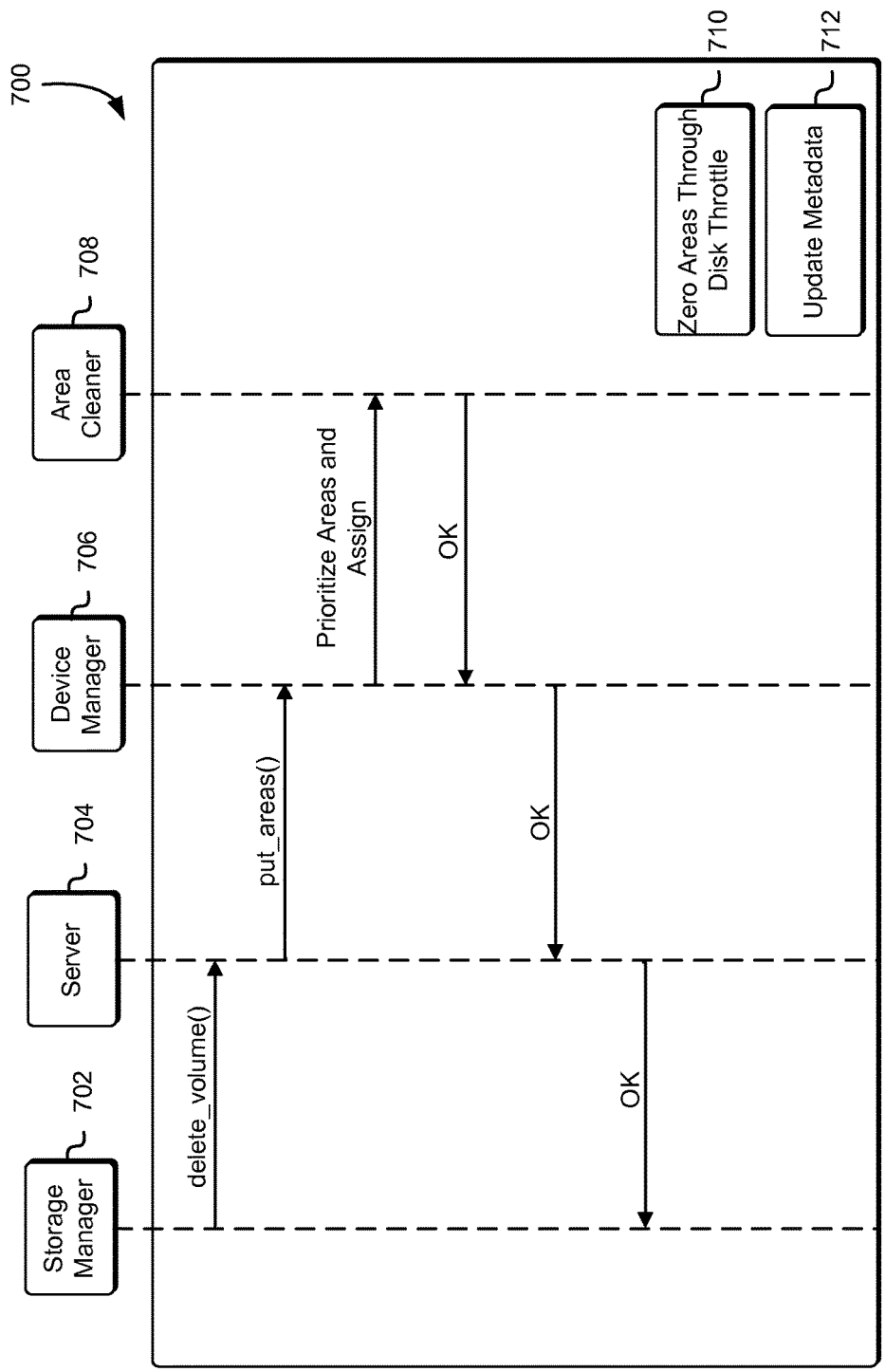
FIG. 7 shows an illustrative example of a process for deleting a volume in accordance with at least one embodiment.

FIG. 7 is an illustrative example of a process 700 for deleting a volume in accordance with at least one embodiment. In the process 700, a storage manager 702 may receive a request from a customer through one or more properly configured API calls to delete a volume. As noted above, the volume may comprise a plurality of areas which may further comprise a plurality of data storage chunks. The data storage chunks within the area may include a bit which may be configured to identify whether the data storage chunk has been initialized or not. As illustrated in FIG. 6, these bits may form a bitmap for the area which may be persistently stored in metadata. The areas within the volume to be deleted may be classified as allocated-dirty areas within the metadata for each area. Thus, the areas may still include customer data.

Once the storage manager 702 receives a request to delete the volume, the storage manager 702 may issue one or more executable instructions to a server 704 to release and reap any areas within the volume. This action may result in the areas becoming unallocated. Accordingly, the metadata for each area may be updated to identify these areas as unallocated-dirty areas.

As noted above, unallocated-dirty areas may need to be cleaned prior to allocation to a newly created volume. Accordingly, a device manager 706 may be configured to assign and prioritize any unallocated-dirty areas for cleaning. The device manager 706 may be configured to prioritize the unallocated-dirty areas based on the bitmap for the area noted above. Thus, the device manager 706 may assign the highest priority to an unallocated-dirty area with the fewest dirty bits. As noted above, this may reduce the time required to clean an area. The device manager 706 may be configured to provide the priority values for each area to an area cleaner 708.

Upon receiving a list of unallocated-dirty areas and their priority for cleaning, the area cleaner 708 may generate a priority queue for cleaning the areas. The area cleaner 708 may be configured to request one or more tokens from a disk bucket within a throttle in order to allocate sufficient bandwidth to perform a number of I/O operations necessary to clean the unallocated-dirty area. If the area cleaner 708 may be configured to select another unallocated-dirty area from the priority queue if the area cleaner 708 is unable to obtain a token to perform I/O operations on a disk associated with an unallocated-dirty area. Once the area cleaner 708 has obtained the necessary tokens to perform the I/O operations on an unallocated-dirty area, the area cleaner 708 may proceed to zero the unallocated-dirty area through the disk throttle 710.

The area cleaner 708 may be configured to update the metadata 712 for an area once the area has been cleaned and zeroed out. For instance, in an embodiment, once an unallocated-dirty area has been zeroed out, the area cleaner 708 may change a *is_zero_area flag in the metadata file for the area such that it is set to "TRUE" instead of "FALSE." Additionally, the bitmap may also be updated such that each bit may be configured to show that the data storage chunks have not been initialized. Consequently, the previously unallocated-dirty area may now be classified as an unclassified-zero area with no persistently stored data. If the server 704 comprises a plurality of solid-state drives, the area cleaner 708 may submit a TRIM command to the server 704 such that the unallocated-zero areas may no longer be considered in use. This may result in a solid-state drive not relocating data from these areas during garbage collection, resulting in potentially fewer writes to the flash. The device manager 706 may now add the newly unallocated-zero area to its report of the system capacity and the unallocated-zero area may now be ready for allocation to a newly created volume.

Figure 8:
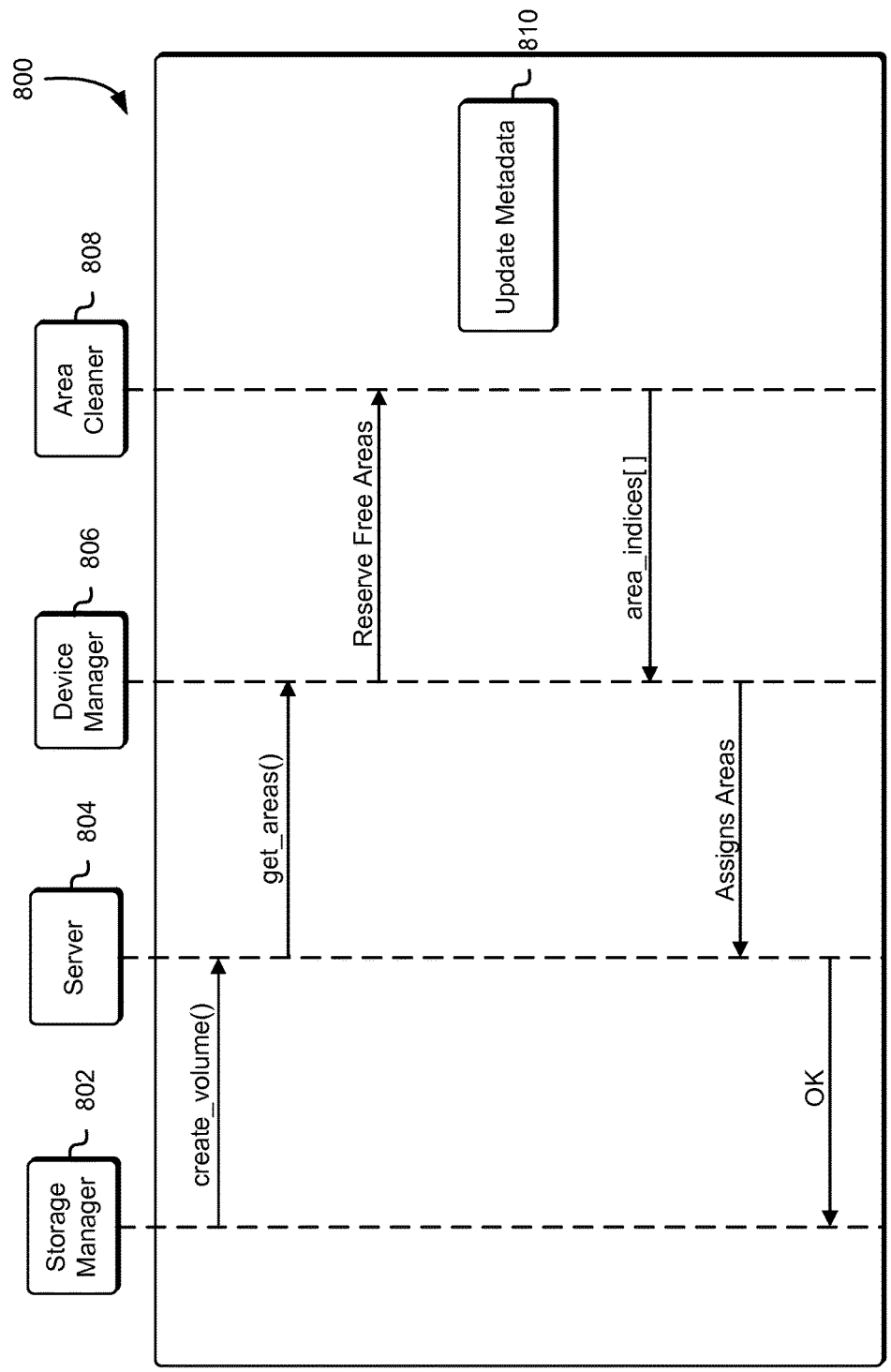
FIG. 8 shows an illustrative example of a process for creating a volume in accordance with at least one embodiment.

Accordingly, FIG. 8 is an illustrative example of a process 800 for creating a data volume in accordance with at least one embodiment. The storage manager 802 may receive a request from a customer to create a new storage volume. The storage manager 802 may make available APIs for the customer, allowing a customer to make properly configured API calls to the service that may affect a data storage volume. The storage manager 802 may further include a database which may be used to identify any data volumes allocated to a customer and any permissible actions that a customer may perform through properly configured API calls to the service. The block-level data storage service may maintain one or more additional databases to provide redundancy for the database the storage manager 802 may utilize. As noted above, this volume may be used to provide a data store for a virtual machine instance. The customer may submit this request through a properly configured API call to the service. As noted above, each storage volume may comprise a plurality of areas which, when combined, may match the storage capacity of the area. Each of the areas may further comprise a plurality of data storage chunks that may be individually initialized. Thus, when a volume is used for data storage, some data storage chunks may be initialized while other data storage chunks may have no data and thus may not have been initialized.

Once the storage manager 802 receives a request to create a new volume, one or more servers 804 may be configured to determine what available capacity exists to satisfy the request. For instance, if a server 804 has no remaining capacity, the server 804 may be configured to return an error message to the storage manager 802 and, in turn, the customer. Alternatively, the server 804 may be configured to report that sufficient capacity may be available at a later time or that the customer request has been added to a queue. In an embodiment, if no capacity exists to satisfy the request, the server 804 may be configured to transmit executable instructions to the storage manager 802 in order to trigger a flag within each volume such that unallocated-dirty areas may be allocated to a newly created volume. If unallocated-dirty areas are allocated to a volume, an area cleaner 808 may clean each of these areas prior to initialization within the volume. The area cleaner 808 may be configured to clean these areas using a priority queue, cleaning areas with the fewest dirty data storage chunks first. If there is sufficient capacity to satisfy the customer request, the one or more servers 804 may transmit a request to a device manager 806 to allocate available capacity to the volume.

Once the device manager 806 has received a request from the one or more servers 804 to allocate available capacity to a newly created volume, the device manager 806 may reserve any available free areas that, when combined, may match the capacity requirements of the newly created volume. Accordingly, the device manager 806 may be configured to identify any unallocated-zero areas and reserve these for allocation. In an embodiment, however, a volume may include a flag that, when triggered, may cause the device manager 806 to additionally identify any unallocated-dirty areas and allocate these to the newly created volume. This may occur if there is a significant backlog in generating new volumes and there is insufficient capacity reported by the servers 804 to satisfy the demand. Thus, the block-level data storage system may be configured to optionally use unallocated-zero areas in the creation of a new volume.

As the device manager 806 reserves any available unallocated-zero areas or unallocated-dirty areas, depending on whether a flag within the newly created volume has been triggered, an area cleaner 808 configured to interface with the device manager 806 may proceed to update the metadata 810 for each of the reserved areas. As noted above, the area cleaner 808 may persistently store a metadata file for each area in a metadata store. Each metadata file may comprise a plurality of flags. For instance, as illustrated in FIG. 6, the metadata file may include a tag that may be used to specify whether an area has been allocated or not. Additionally, the file may include a tag that may be used to specify whether an area is clean or dirty (e.g., non-zero).

Once the device manager 806 has reserved any free areas, the area cleaner 808 may be configured to change the classification of the reserved areas from "unallocated-zero" (or, if the newly created volume so indicates through a flag, "unallocated-dirty") to "allocated-dirty." Once the area cleaner 808 has updated the metadata for each of the unallocated areas that are to be allocated to the newly created volume, the area cleaner 808 may interface with the device manager 806 to provide the necessary unallocated areas for the new volume. Accordingly, the device manager 806 may assign these areas to a newly created volume through the one or more servers 804. At this point, the servers 804 may be configured to update any reports indicating the available storage capacity of the data storage system. Additionally, the area cleaner 808 may continue cleaning any unallocated-dirty areas in order to satisfy future demand for zeroed out areas.

While the use of a device manager on a server level is used extensively throughout the present disclosure to illustrate the process of allocating any cleaned unallocated-dirty areas to a newly created volume, the scope of the present disclosure is not limited to the sole use of a device manager on a server level for such a purpose. For instance, the block-level data storage service may additionally include a placement service for addressing any create volume commands received through the storage manager 802. This placement service may be configured to obtain information published by the plurality of servers 804 relating to the availability of unallocated-zero areas available for allocation. Accordingly, the placement service may be configured to determine which of the servers can accommodate the request for the creation of a new volume and subsequently transmit the create volume command to the selected server 804.

Figure 9:
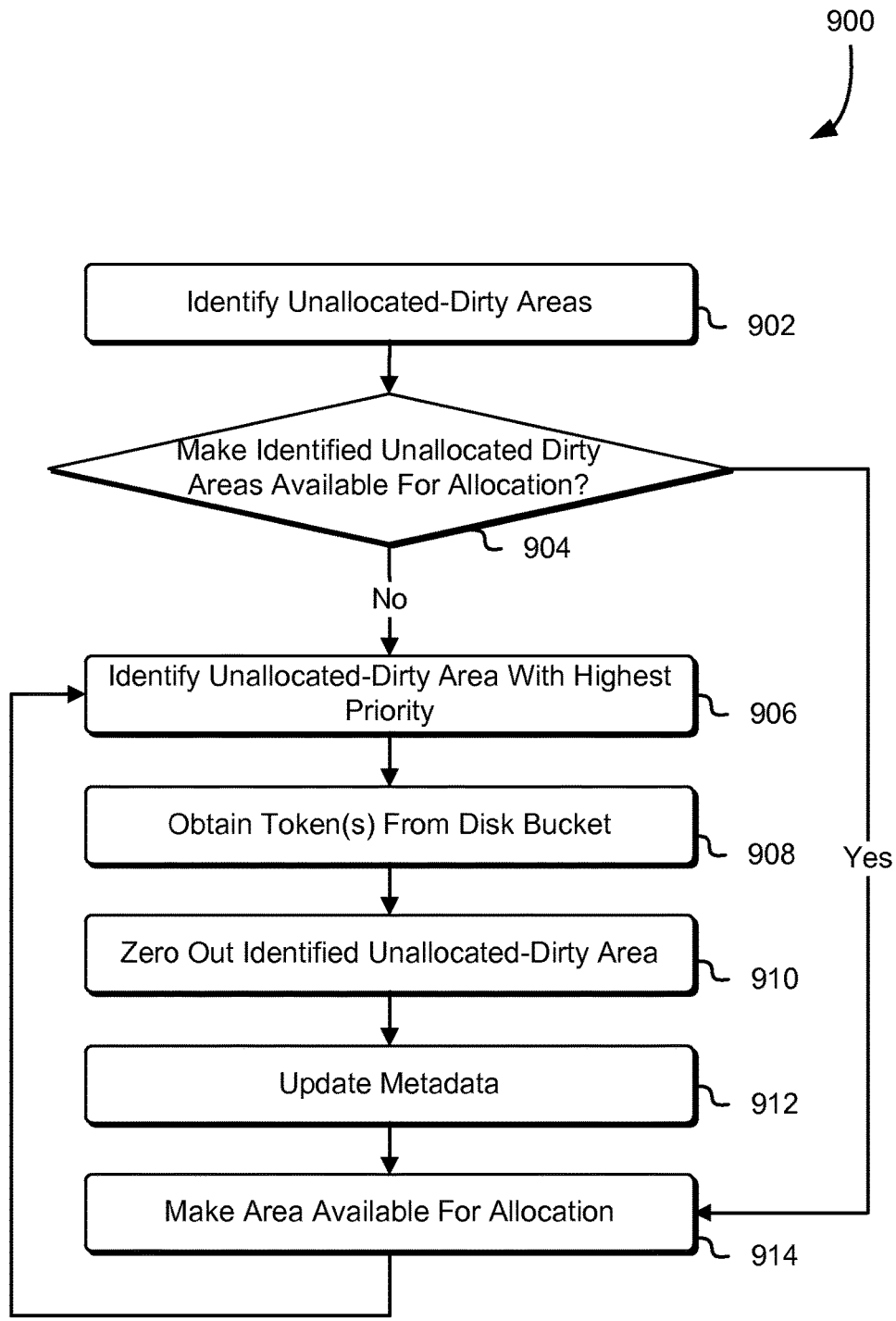
FIG. 9 shows an illustrative example of a process for zeroing out unallocated-dirty areas in accordance with at least one embodiment.

As noted above, an area cleaner may be configured to clean any unallocated-dirty areas in order to generate capacity for the block-level data storage system. Accordingly, FIG. 9 is an illustrative example of a process 900 for cleaning any unallocated-dirty areas in accordance with at least one embodiment. As illustrated in FIG. 3, a single logical volume may comprise a plurality of data storage areas. Each of these areas may be classified into different categories depending in whether the area has been allocated to a volume or whether the area has been zeroed out or not. For instance, as illustrated in FIG. 6, the classification of each area may be stored in a metadata file. This file may include one or more flags that may be used to specify the current status of the area and thus provide the area with a classification. Since the purpose of the area cleaner may be to clean any unallocated-dirty areas, the process 900 may include having the area cleaner identify 902 all areas that have been classified as unallocated-dirty. All identified unallocated-dirty areas may be placed in a queue from which the area cleaner may select an area and proceed to zero it out.

In an embodiment, the device manager may be configured to only allocate unallocated-zero areas. However, the block-level data storage system, upon creation of a volume, may be configured to trigger a flag within the volume that may be used to specify that unallocated-dirty areas may be allocated to this volume. As noted above, this may be done in the interest of time if there are insufficient zeroed out areas available for allocation. Thus, the process 900 may include determining 904 whether to make the identified unallocated-dirty areas available for allocation. If the newly created volume has been configured to accept one or more unallocated-dirty volumes, the area cleaner may make 914 any identified unallocated-dirty areas available for allocation without performing any cleaning operations. However, once these areas have been allocated to a newly created volume, these areas may still need to be cleaned prior to use. This may result in some latency in performing I/O operations on an area within a volume for the first time (e.g., first-touch penalty).

If a newly created volume has not been configured to accept unallocated-dirty areas, the device manager may be configured to prioritize each of the unallocated-dirty areas. For instance, the device manager may be configured to analyze the metadata file for each of the unallocated-dirty areas to determine which areas require less rigorous cleaning. As noted above, each area may comprise a plurality of data storage chunks. The area may be configured to maintain a bit for each data storage chunk that may be used to specify whether the data storage chunk has been initialized. If the data storage chunk has been initialized, then the bit may be activated. All the bits within an area may be stored in a metadata file, forming a bitmap. Accordingly, the device manager may prioritize any unallocated-dirty areas based on the bitmap such that an area with the fewest dirty bits may be granted the highest priority.

The device manager may be configured to prioritize all unallocated-dirty areas and organize them in a queue within the area cleaner. Accordingly, the area cleaner may be configured to identify 906 the unallocated-dirty area with the highest priority. As noted above, an area with the fewest dirty bits may be granted the highest priority for cleaning. The area cleaner may be configured to only clean any dirty data storage chunks within an unallocated-dirty area and leave any uninitialized data storage chunks untouched. This may serve to reduce the time necessary to zero out an area. While the prioritization of unallocated-dirty areas is based on the number of dirty bits within the area for the purpose of illustration, the scope of the present disclosure is not necessarily limited to the use of dirty bits explicitly noted herein.

Once the area cleaner has identified the unallocated-dirty area with the highest priority, the area cleaner may proceed in selecting the area and attempt to zero it out. In order to perform the necessary I/O operations to zero out an area, the area cleaner may require sufficient disk bandwidth to perform the operations. The block-level data storage system may comprise a disk throttle that may be configured to limit the bandwidth an application may utilize when accessing a disk. In order to accomplish this, the disk throttle may include a disk bucket which in turn may comprise a plurality of bandwidth tokens. These tokens, when combined, may match the available bandwidth of the storage device. Thus, multiple applications may be configured to obtain one or more tokens in order to perform one or more operations on the storage device.

Accordingly, the area cleaner may be configured to obtain 908 one or more tokens from the disk bucket in order to clean an unallocated-dirty area. If there are no tokens available to perform these I/O operations, the area cleaner may be configured to transmit executable instructions to the device manager which may cause the device manager to transmit an error message to the customer. The device manager may also be configured to display a message to the customer indicating the estimated amount of time before the area cleaner may gain access to sufficient tokens. The area cleaner may be configured to obtain any available tokens from the disk bucket to maximize the bandwidth it may use to clean the area. This, in turn, may reduce the time necessary to perform any I/O operations on the area.

The area cleaner may be configured to zero out 910 the identified unallocated-area with the highest priority if the area cleaner has obtained sufficient tokens to perform the necessary I/O operations. As noted above, an unallocated-area with the highest priority may be one that has the fewest dirty bits. Accordingly, the area cleaner may be configured to clean and zero out only the data storage chunks that have been initialized and as a result are considered dirty. This, in turn, may reduce the number of tokens necessary to clean the unallocated-dirty area. The process of zeroing out an unallocated-dirty area may include removing any prior customer data that may still remain in the area as well as any other data that may be present. As a result, the area cleaner may produce an area devoid of any data.

Once the unallocated-dirty area has been cleaned and zeroed out, the area cleaner may be configured to update 912 the metadata associated with the area. As noted above, the area cleaner may persistently store a metadata file for each area within the block-level data storage system. Each metadata file may include a plurality of flags that may be used to specify whether an area is allocated or unallocated and whether an area is dirty or clean. Accordingly, the area cleaner may be configured to change the flag used to specify whether an area is dirty or clean such that the area cleaner is reclassifying the area as clean. For instance, as illustrated in FIG. 6, the area cleaner may change the *is_zero_area flag from "FALSE" to "TRUE" upon cleaning the area. In addition, the bitmap may further be updated to show that no bits have been initialized.

As noted above, the device manager may be configured to assign and allocate unallocated-zero areas to a volume. Accordingly, the process 900 may include making 914 an area available for allocation. The device manager may be configured to identify all unallocated-zero areas and determine the available storage capacity within the block-level data storage system. Thus, the more unallocated-zero areas are available, the greater the available storage capacity reported. Once an unallocated-zero area has been made available, the area cleaner may proceed to identify 906 an unallocated-dirty area from the queue with the next highest priority and clean this area. In this fashion, the area cleaner may be configured to clean all unallocated-dirty areas with greater efficiency.

Figure 10:
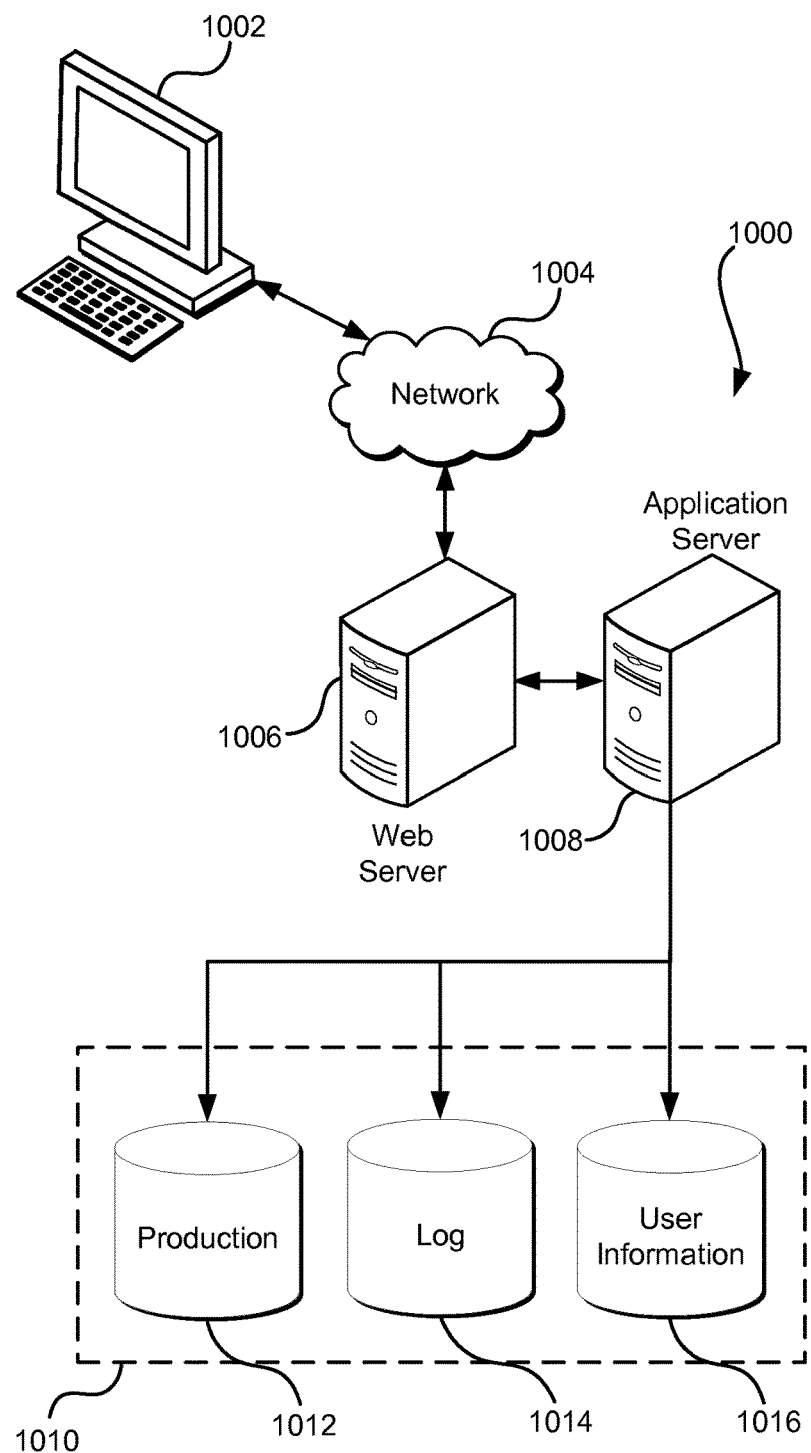
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   maintaining, for at least a first data storage area of a logical data volume that comprises a plurality of data storage chunks and is backed by a plurality of storage devices, a map that, for each data storage chunk of the plurality of data storage chunks, indicates whether the data storage chunk has been modified while allocated to the logical data volume;
   associating, based at least in part on the map, the first data storage area with a classification of a plurality of classifications;
   selecting for cleaning, the first data storage area based at least in part on the classification of the first data storage area and based, at least in part, on a number of corresponding data storage chunks in the first data storage area comprising data;
   selecting, from the first data storage area, one or more data storage chunks based at least in part on the map;
   erasing, in accordance with a throttle that uses a token bucket to limit I/O, the throttle allocating tokens for erasure operations while reserving a portion of the tokens for other operations against the logical data volume, data from the one or more data storage chunks without modifying one or more other data storage chunks of the first data storage area, the one or more other data storage chunks being unmodified upon said erasing as a result of each of the one or more other data storage chunks having a particular corresponding classification of the plurality of classifications; and
   in response to erasing the data from the one or more data storage chunks, reclassifying the first data storage area.

2. The computer-implemented method of claim 1, wherein reclassifying the first data storage area includes associating the first data storage area with a particular classification that, as a result of being associated with the first data storage area, indicates that the first data storage area is ready to be allocated to the logical data volume.

3. The computer-implemented method of claim 1, further comprising, at a time after reclassifying the first data storage area, updating a database that maintains statistical data illustrating availability of data storage areas comprising only customer data storage chunks for allocation to the logical data volume.

4. The computer-implemented method of claim 1, further comprising, at a time after reclassifying the first data storage area, allocating the first data storage area to another logical data volume.

5. The computer-implemented method of claim 1, wherein:
   the throttle comprises a disk bucket that includes a plurality of I/O operation tokens that are necessary for permission to perform erasing I/O operations upon the data storage chunks on the logical data volume; and
   erasing data from the one or more data storage chunks comprises obtaining a portion of the plurality of I/O operation tokens before performing the erasing I/O operations to the logical data volume data storage chunks.

6. A computer-implemented method for managing storage space, comprising:
   identifying an unallocated data storage area from a plurality of data storage areas of a logical volume that each comprises a plurality of sub-areas, the unallocated data storage area backed by a plurality of storage devices;
   selecting a set of sub-areas of the plurality of sub-areas based at least in part on information that tracks operations performed on individual sub-areas of the unallocated data storage area and based, at least in part, on an amount of data stored in the set of sub-areas;
   modifying the selected set of sub-areas in accordance with a throttle that uses a token bucket to limit I/O, the throttle allocating bandwidth for operations while preventing all of the bandwidth from being allocated for erasure operations against the logical volume; and
   at a time after modifying the selected one or more sub-areas, enabling the identified unallocated data storage area to be allocated to a data volume.

7. The computer-implemented method of claim 6, wherein identifying the unallocated data storage area is based at least in part on the unallocated data storage area being classified as containing previously written customer data.

8. The computer-implemented method of claim 6, wherein one or more operations were performed on the selected one or more sub-areas while the identified unallocated data storage area was allocated to a corresponding data volume from which the identified unallocated data storage area was deallocated.

9. The computer-implemented method of claim 6, wherein bandwidth is allocated by at least:
providing a bucket of tokens that represent available bandwidth;
allocating a token from the bucket for write operations; and
retaining a quantity of unallocated tokens in the bucket for other operations.

10. The computer-implemented method of claim 6, wherein the selected one or more sub-areas are comprised of data storage chunks having a uniform size.

11. The computer-implemented method of claim 6, wherein modifying the selected one or more sub-areas includes erasing data written in the selected one or more sub-areas.

12. A system, comprising:
a plurality of data storage devices comprising a plurality of data storage areas of a logical volume, the plurality of data storage areas including at least a first data storage area backed by the plurality of data storage devices and comprising a plurality of data storage chunks;
one or more processors; and
memory including instructions that, if executed by the one or more processors, cause the system to implement a system manager that:
for at least the first data storage area, maintains information that tracks data storage chunks within the first data storage area based, at least in part, on a number of corresponding data storage chunks that comprise data and that have been affected by a write operation while the first data storage area was allocated to a first data volume;
after the first data storage area is deallocated from the first data volume, uses the information to erase data from the data storage chunks within the first data storage area that have been affected without modifying data storage chunks that, according to the information, were unaffected while the first data storage area was allocated to the first data volume, the erasing in accordance with a throttle that uses a token bucket to limit I/O, the throttle allocating bandwidth to prevent erasure operations from utilizing all input/output bandwidth against the logical volume; and
in response to the data from the affected data storage chunks of the deallocated data storage area having been erased, allocates the first data storage area to a second data volume.

13. The system of claim 12, wherein the information associates each data storage chunk with a value that indicates whether data has been written to a particular data storage chunk.

14. The system of claim 12, wherein the instructions further cause the system to, as a result of the information being used to erase data from the data storage chunks that have been affected, issue a TRIM command to the plurality of data storage devices that stores the first data storage area.

15. The system of claim 12, wherein the information is further used to prioritize the plurality of data storage areas at least in part on a number of affected data chunks, relative to the plurality of data storage areas.

16. The system of claim 12, wherein the system manager further provides a classification to the first data storage area and erases data from affected data storage chunks based at least in part on the classification.

17. The system of claim 12, wherein the system manager further allocates one or more subsets of the plurality of data storage areas to a plurality of data volumes.

18. One or more non-transitory computer-readable storage media that stores executable instructions that, if executed by one or more processors of a computer system, cause the computer system to:
deallocate a data storage area of a logical volume from a first data volume, the data storage area backed by a plurality of data storage devices;
add the data storage area to a set of deallocated data storage areas;
select, from the set of deallocated data storage areas, the data storage area to be cleaned;
select, from the data storage area based, at least in part, on a number of corresponding data storage chunks comprising data, and information that tracks states of the corresponding data storage chunks, one or more data storage chunks with a corresponding state to be cleaned;
modify the selected one or more data storage chunks without modifying one or more unselected data storage chunks from the data storage area, the modifying in accordance with a throttle that uses a token bucket to limit I/O, on modifying operations to data storage chunks within the data storage area, the throttle allocating bandwidth for each modifying operation while reserving a portion of the bandwidth for other operations against the logical volume; and
at a time after modifying the selected one or more data storage chunks with the corresponding state, enable the data storage area to be allocated to a second data volume.

19. The one or more non-transitory computer-readable storage media of claim 18, wherein the instructions further cause the computer system to update the information that tracks states of corresponding data storage chunks in accordance with a process that verifies readability of data.

20. The one or more non-transitory computer-readable storage media of claim 18, wherein the selection of the data storage area to be cleaned is based at least in part on a number, relative to one or more other deallocated data storage areas, of corresponding data storage chunks with the corresponding state to be cleaned.

21. The one or more non-transitory computer-readable storage media of claim 18, wherein the states of the corresponding data storage chunks indicate whether each of the one or more data storage chunks satisfies one or more conditions for allocation to a data volume.

22. The one or more non-transitory computer-readable storage media of claim 18, wherein modifying the one or more data storage chunks with the corresponding state includes erasing data from within the one or more data storage chunks with the corresponding state.

23. The one or more non-transitory computer-readable storage media of claim 18, wherein the instructions further cause the computer system to change the information that tracks states of the selected data storage chunks upon modification of the selected data storage chunks.

\* \* \* \* \*